United States Patent Office 2,754,162
Patented July 10, 1956

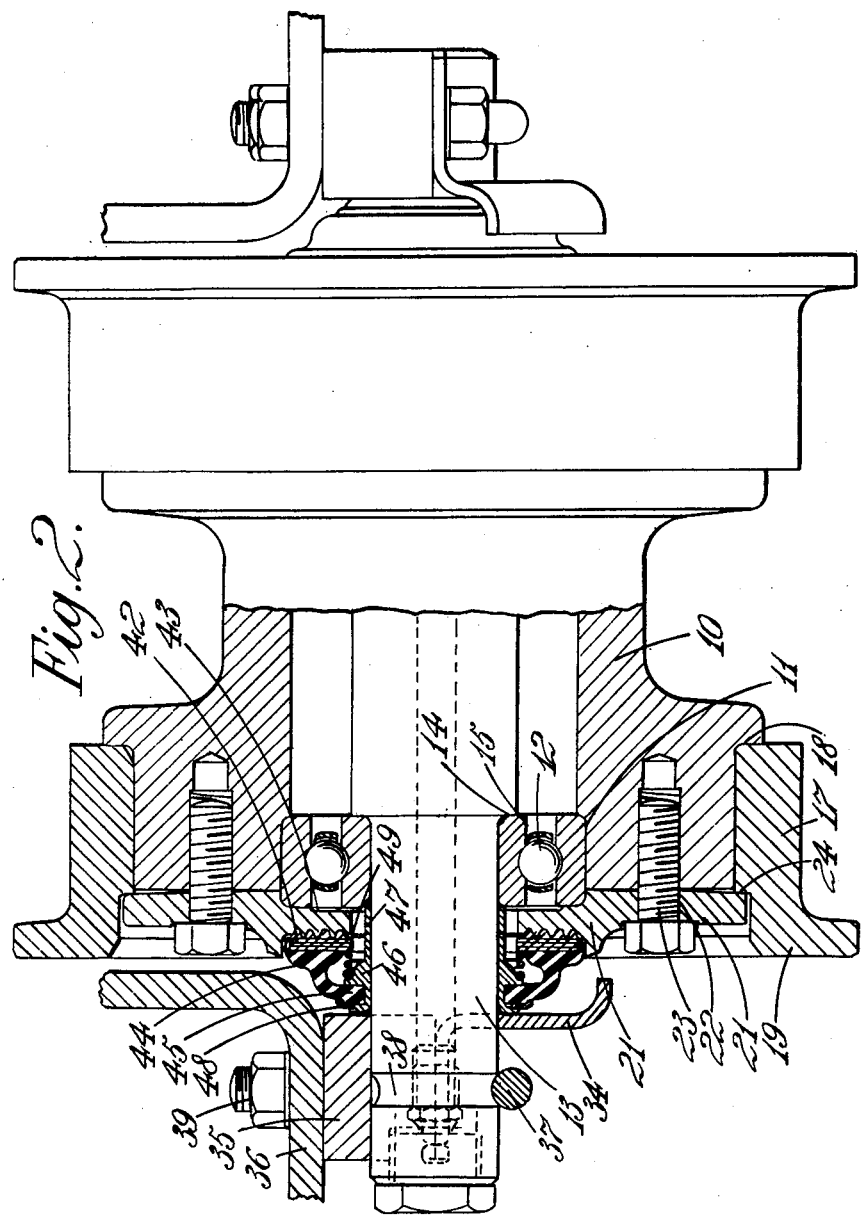

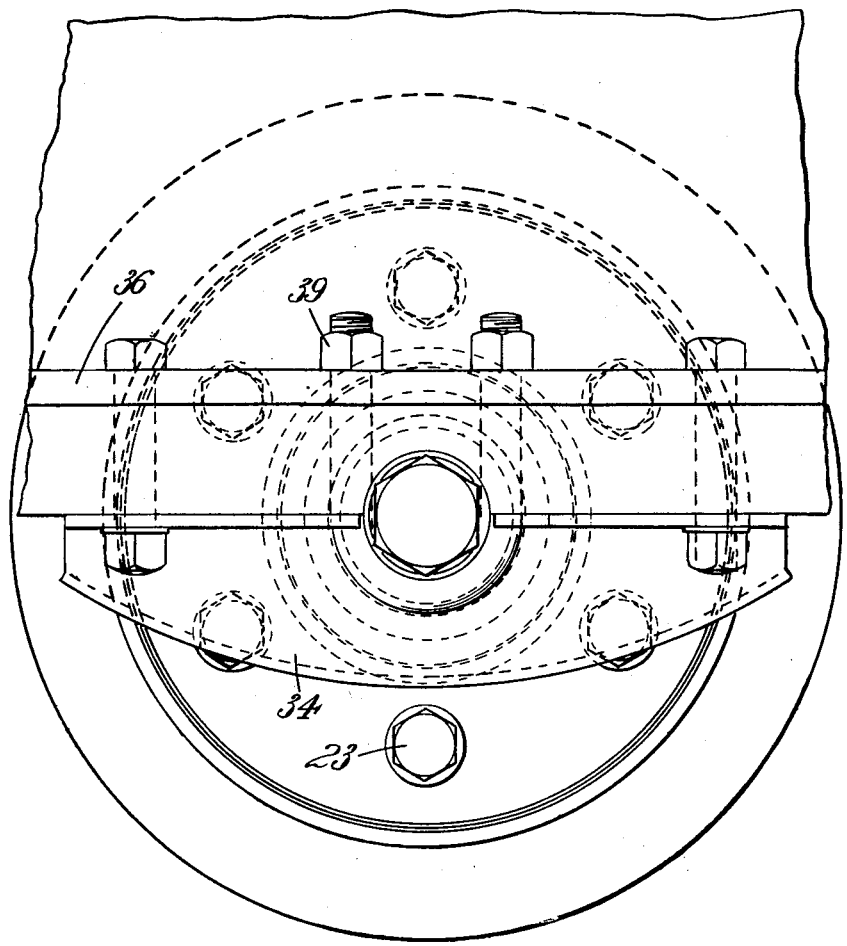

2,754,162

DEVICES FOR PREVENTING DIRT ENTERING AND FLUID LEAVING BEARING SURFACES

Ernest Thomas James Tapp, Aldershot, England, assignor to County Commercial Cars Limited, Aldershot, England, a British company Application August 5, 1953, Serial No. 372,428

Claims priority, application Great Britain August 7, 1952

2 Claims. (Cl. 308—187.1)

This invention relates to devices for preventing dirt entering and fluid leaving bearing surfaces of relatively rotating parts and is particularly applicable to bearings for rollers supporting endless tracks of vehicles since mud and dirt is liable to enter such bearings resulting in excessive wear.

According to this invention a device for preventing dirt entering and fluid leaving bearing surfaces of two relatively rotating parts comprises two elements respectively attached to or formed on said parts and provided with contacting faces disposed transversely to the axis of rotation which contacting faces are provided with inter-engaging projections and grooves of circular contour concentric about said axis of rotation.

Preferably means are provided for resiliently pressing said faces together.

The face of one of said elements may be formed of or provided with a lining of yielding material such as leather, rubber or synthetic rubber. The face of the other part may be formed of metal, or both faces may be formed of metal.

The aforesaid elements are fixed against rotation on their respective parts so that either or each of them may yield at least radially, whereby excessive wear on the interengaging grooves and projections is avoided.

Either or each of the elements may also be so mounted as to be capable of universal movement about axes transverse to the axis of rotation. One of said elements may be rigidly fixed to the part which carries it. In such an arrangement the interengaging grooves and projections constitute the sole means for locating the elements in relation to one another thereby preventing undue wear in the event of the parts carrying them being out of line or the rotating part becoming distorted or bent.

The means for resiliently pressing the faces together may comprise a helical compression spring encircling one of the relatively rotatable parts and engaging at one end an abutment fixed against axial movement and at the other end engaging that element which is capable of yielding axially on the part to which it is connected.

In an alternative arrangement instead of a helical compression spring there may be provided a block of resilient material which tightly embraces one of said parts and one side of which block abuts against one of the aforesaid elements while the other side of the block engages a fixed abutment, which body is compressed during assemblage so as to apply the necessary axial force to said element.

The invention is particularly applicable to ball or roller bearings and a feature of the present invention consists in that one of the aforesaid elements with the circular projections and grooves constitutes a plate for retaining the ball or roller bearing within its housing which plate is secured to the housing by suitable securing means.

The aforesaid circular projections and grooves may be so shaped that the summits of the circular projections on one element do not contact with the bottom on the grooves of the other element. The circular projections and grooves may be V-shaped in cross section and the annular relationship of the sides of the V's are selected in accordance with the axial pressure in maintaining the two elements together, reference being made to the accompanying drawings in which:

Figure 2 is a similar view to Figure 1 of an alternative construction, and

Figure 3 is a side elevation of the arrangement shown in Figure 2.

Figure 1:
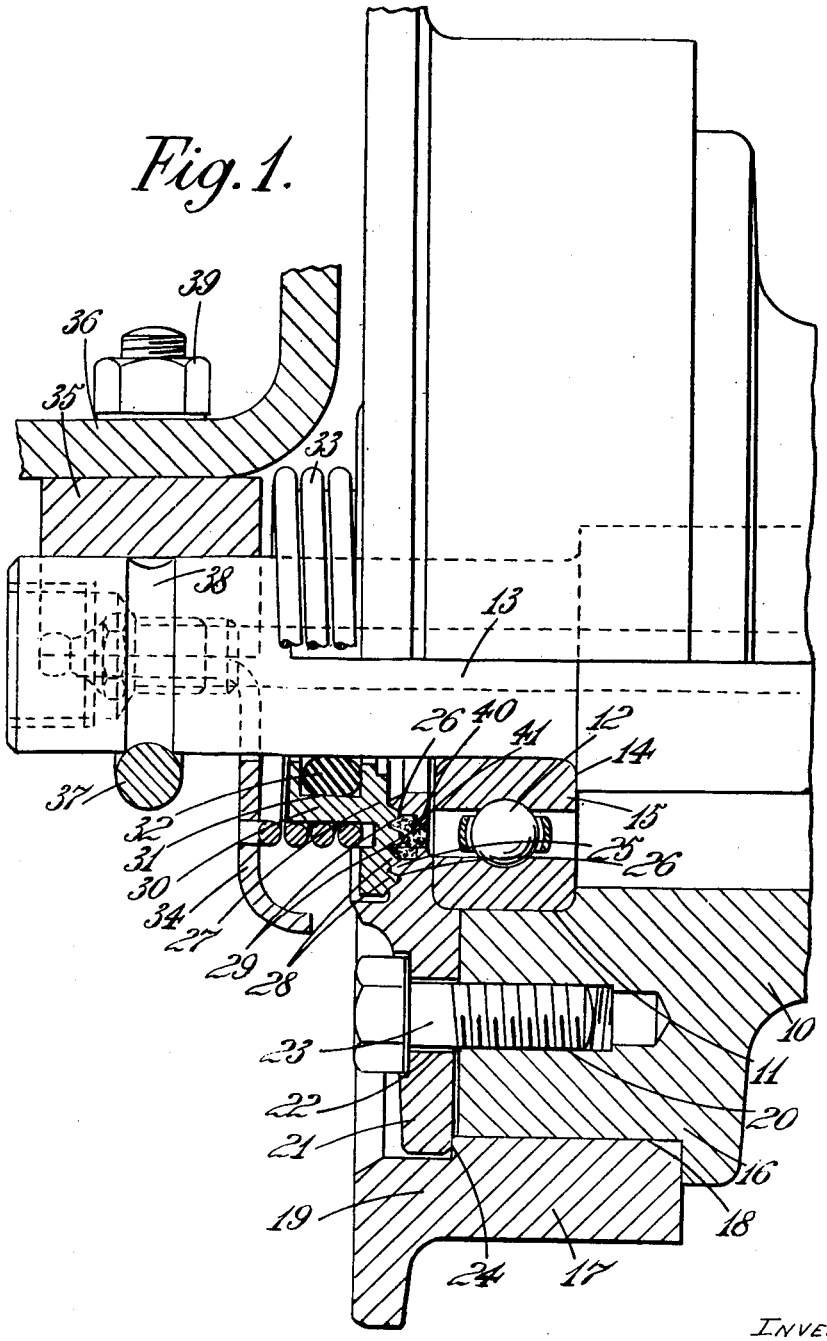
Figure 1 is a part vertical section and part elevations through one end of a roller and its supporting spindle.

Referring to the arrangement shown in Figure 1. Each roller comprises a hollow hub portion 10 provided at opposite ends with housings 11 for ball or roller bearings 12.

A supporting spindle 13 extends through the two bearings and is stepped to provide shoulders 14 which engage the inner sides of the inner races 15 of the bearings. The hub portion is provided with an outwardly extending flange 16 the periphery of which is encircled by a tread portion 17 which abuts a shoulder 18 formed on the flange and is of such an axial width as to project at 19 beyond the ends of the hub. Each end face of the hub is provided with a number of threaded holes 20 and a bearing retaining plate 21 is disposed over the end face of the hub and is provided with a number of holes 22 in register with the holes 20 in the hub portion and through which clamping screws 23 extend and engage the threaded holes. Each plate is of a greater diameter than the external diameter of the hub so as to engage an end face 24 or internal shoulder of the tread portion, which projects a small distance, e. g. about .010 inch beyond the end face of the hub. As the clamping screws 23 are tightened, the plate 21 to a very small extent flexes, which ensures that the tread portion is clamped against axial movement as well as being a tight fit radially. The outer face of each said retaining plate is provided with concentric projections 25 and grooves 26 which are V-shaped in cross-section. The spindle 13 is encircled by a metal element 27 having a face disposed opposite the grooved portion of the retaining plate 21, which face is provided with concentric projections 28 and grooves 29 which intermesh with those of the retaining plate 21. One or more stepped holes 40 are formed on the retaining plate so as to intersect certain of the concentric projectors and grooves, which holes accommodate lubricant absorbent pads 41 which may receive lubricant from the inner side of the plate 21 opposite the ball bearing 12. Lubricant may also pass from the ball bearing and through a recess usually provided on the inner face of the plate 21 so that it may reach the junction of the interengaging grooved faces. The element 27 is also provided with a hub portion 30 the inner face of which is provided with a circumferential groove 31 in which is located a resilient ring 32 which yieldingly embrace the spindle 13 and support the element thereon. The internal diameter of the element 27 is greater than that of the spindle so as to enable it to float thereon. The hub portion of the element is closely encircled by a helical compression spring 33 an end convolution of which abuts against that portion of the element which is opposite the retaining plate 21 and a convolution at the other end of which spring abuts against a fixed plate 34. The extremities of the spring 33 are bent in an axial direction and respectively engage holes in the latter plate 34 and in said element 27 thus limiting relative rotation between these parts.

In the case where a number of such spindles 13 and rollers 18 are arranged side by side as is usual in an endless track vehicle the ends of the spindles 13 on each side of the rollers are located in half cylindrical grooves formed on the underside of a bar 35 attached to a bracket 36 member extending along the assemblage and each spindle is secured to that bar by a U-bolt 37 which engages a circumferential groove 38 in the spindle and the limbs of which U-bolt pass through holes in the bar and through the brackets and have their threaded extremities engaged by clamping nuts 39.

There is also secured to the under face of the bar on either side of each spindle the plate 34 which is flanged downwardly opposite each of the aforesaid elements which carry the resilient grooved material and which downwardly extending flanges form parts of the part which supports spring 33.

Both the element 27 and the retaining plate 21 may be formed for example from cast iron and one or other of the opposed faces may be provided with an annular groove which accommodates a resilient lining formed for example, from leather or rubber or synthetic rubber. It is found with the above arrangement that since the element 27 is resiliently mounted on the spindle 13 by means of the resilient ring 32, very little wear takes place between the interengaging projection groove on the element 27 and the retaining plate 21, particularly as these interengaging faces are fed with lubricant by means of the pads 41.

The arrangement shown in Figure 2 is very similar to that described above with the exception that in place of the element 27 there is provided an annular plate 42 formed from cast iron and provided with concentric projections and grooves on an inner face which intermesh with the projections and grooves on the face of the retaining plate 21. The internal diameter of the annular plate 42 and the diameter of the hole in the retaining plate 21 are greater than the diameter of the spindle 13 and the inner face of the plate 21, as is usual, is provided with a recess 43 and this recess enables lubricant to pass from the ball-bearing 12 to the junction of the interengaging faces thus lubricating them.

The annular plate 42 is bonded to a rubber holder 44 which is provided with an inwardly directed flange 45 which engages a circumferential groove in a head 46 formed at one end of a metal sleeve 47 which encircles the spindle 13 and passes loosely through the annular plate 42 and the hole in the retaining plate 21. A metal ring 48 is swaged over a rib on the rubber holder 44.

The enlarged head 46 provides a shoulder for one end of a small compression spring 49, the other end of which engages the annular plate 42. The sleeve 47 is arranged firmly to grip the spindle 13 and is positioned so as to abut at one end against the inner ring of the bearing 12 while a small gap is provided between the other end of the sleeve and the bar 35 thus the small compression spring forces the annular plate 42 into engagement with the retaining plate 21. It will be appreciated that with this arrangement, the annular plate 42 by reason of its rubber mounting has a certain degree of universal freedom of movement and can float in a radial direction thus reducing the wear between the interengaging projections and groove. As in the previous construction the cover plate 21 may be provided with a number of holes overlapping certain of the projections and corrugations, which holes accommodate lubricating pads.

In either of the arrangements referred to above, either the face of the retaining plate may be flat instead of being provided with concentric grooves and projections, and the face which engages it is provided with said projections and grooves, or vice versa.

In the construction shown in Figure 1 and Figure 2 instead of the interengaging grooves and projections being V-shaped, one of them only may be V-shaped and the other may be rectangular in configuration, so as to provide a line contact.

It will be appreciated other modifications in detail of construction may also be made. For example, instead of the rotating element being provided with the resiliently yielding face of leather or the like and the other element being formed with a metal face, the reverse of such an arrangement could be provided i. e. the resilient face could be formed on the fixed element and the metal face on the rotating element.

Also instead of one element being rigidly fixed to the rotating part and the element being universally mounted on its part that arrangement could be reversed i. e., the element is rigidly fixed to the stationary part and the other element universally mounted on the rotating part.

I claim:

1. A sealed bearing between two relatively rotating parts, comprising a bearing housing in one of said parts, a bearing in the housing encircling the other part, a retaining member rigidly fixed to the housing and axially retaining the bearing therein, said retaining member having integrally formed on the outer face thereof a number of concentric circular projections and grooves, a metal sealing member mounted opposite said face and having concentric projections and grooves intermeshing with said first-mentioned projections and grooves, the opposite face of said sealing member being bonded to a rubber backing member; said rubber backing member being formed with an inwardly extending radial portion fixed to said other part so as to permit radial movement of said backing member; a coil spring around the other part disposed between the radial portion of the rubber member and the metal sealing member to resiliently urge the sealing member in contact with the retaining member; said retaining member being recessed on the inner face adjacent the bearing to provide a lubricating space leading to the junction between the two faces having the concentric grooves and projections and to permit the lubricant from the bearing to reach the sealing member.

2. A sealing bearing as set forth in claim 1, wherein the retaining member is provided with a plurality of lubricating apertures disposed opposite the bearing, and lubricating pads in said apertures.

References Cited in the file of this patent

UNITED STATES PATENTS

| 883,155 | Westinghouse | Mar. 24, 1908 |
| 1,204,063 | Pratt | Nov. 7, 1916 |
| 1,845,363 | Thompson | Feb. 16, 1932 |
| 2,265,951 | Miner | Dec. 9, 1941 |
| 2,283,871 | Norelius | May 19, 1942 |
| 2,358,830 | Schick | Sept. 26, 1944 |
| 2,489,212 | Zwack | Nov. 22, 1949 |
| 2,501,984 | Alward | Mar. 28, 1950 |
| 2,667,388 | Schick | Jan. 26, 1954 |

FOREIGN PATENTS

| 348,374 | Great Britain | May 14, 1931 |
| 361,704 | Great Britain | Nov. 26, 1931 |
| 564,370 | Great Britain | Sept. 25, 1944 |